Sept. 25, 1934.  J. H. SPRAY  1,974,758
FILM MEASURING DEVICE
Filed Feb. 20, 1930
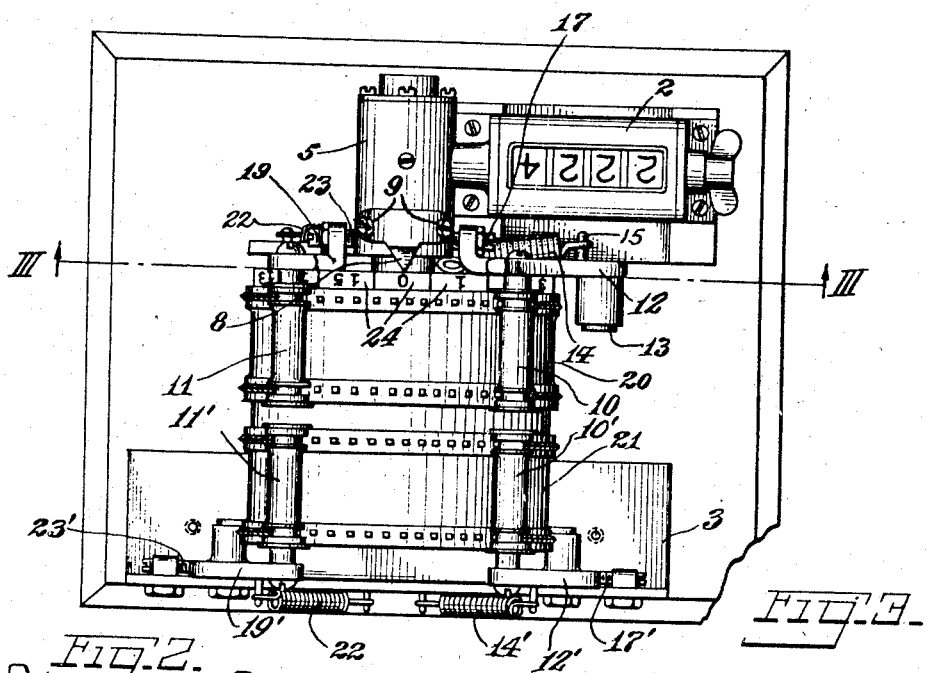
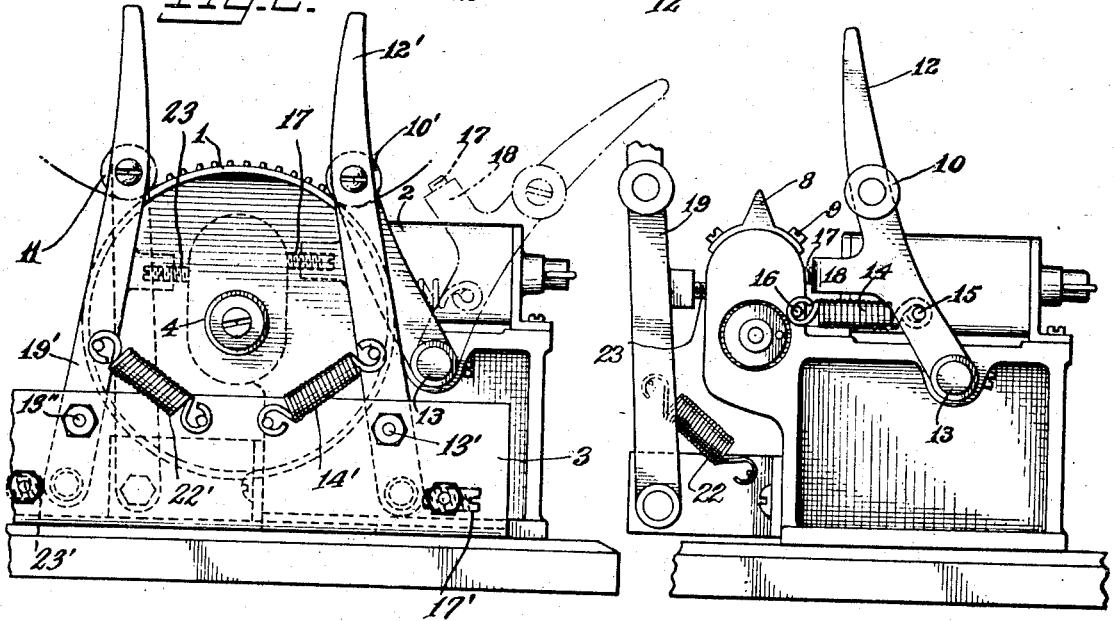
JOSEPH H. SPRAY
INVENTOR
BY
ATTORNEY Patented Sept. 25, 1934

1,974,758

UNITED STATES PATENT OFFICE 1,974,758

FILM MEASURING DEVICE

Joseph H. Spray, Rutherford, N. J., assignor to Warner Bros. Pictures, Inc., New York, N. Y., a corporation of Delaware Application February 20, 1930, Serial No. 429,916

2 Claims. (Cl. 33—129)

This invention relates to film measuring devices and an object of this invention is to provide a device which at all times will give an indication not only of the number of feet but also of the number of frames of moving picture film which have passed therethrough.

According to my invention the film passes over a counting wheel having peripheral numbered divisions each of which corresponds to one moving picture frame. This counting wheel is coupled to a register of any ordinary type which gives indications in feet. By reading the indication on the register and the indication on the wheel we have therefore, at any time, an indication of the number of feet and the number of frames of film which have passed through the device. The counting wheel may make one revolution for a change of one unit shown on the register. In this case the counting wheel will have an appropriate number of peripheral divisions corresponding to the number of frames in one unit of length of moving picture film.

Another feature of my invention is the provision of a machine of the type described above, wherein the wheel is provided with a plurality of film paths, one for a master film and another for a film to be compared with it, and inspected.

For a fuller description of the invention references may be made to the accompanying drawing, in which:

Fig. 1 is a plan view of the apparatus.
Fig. 2 is a front elevation of the apparatus.
Fig. 3 is a front elevation partly in section along the lines III—III.

The counting devices 1 and 2 are mounted on a base 3. The counting wheel or drum 1 is carried by a shaft 4 and is connected to the register 2 by suitable gearing (not shown) which is contained in housing 5. The counting wheel 1 has a plurality of film paths 20, 21 which may comprise the ordinary moving picture sprocket wheel teeth, and is provided with peripheral numbered divisions 24. A pointer or indicator 8 is attached by screws 9 to the housing 5 in order to show the reading position on the counting wheel. The film strips are led onto the counting wheel 1 under spring-pressed rollers 10 and 10', over the top of the counting wheel and from it under rollers 11 and 11'. Each roller 10 and 10' is fixed to an arm 12 and 12' respectively pivoted on the base 3 as at 13 and 13'. Similar arms 19 and 19' are furnished for rollers 11 and 11'. Springs 14, 14' and 22, 22' are provided for urging the rollers 10, 10' and 11, 11' toward the counting wheel 1. The rollers 10 and 11 are kept at a suitable distance from the roller 1 by means of set screws 17 and 23 respectively which are attached to the arms 12 and 19 and adapted to strike against housing 5 or other appropriate stop members. Arms 12' and 19' are pivoted to the base 3 at 13' and 13'', and set screws 17' and 23' secured to the base 3 bear against the lower ends of these arms to hold the rollers 10' and 11' in spaced relation to drum 1.

In utilizing the device a single film may be led over one of the paths of the wheel or drum in which case the exact portion of the film which is opposite pointer 8 at any given instant of time, may be identified by reading the number shown on register 2, which may be feet, and the number on the drum 1, which is opposite the pointer. This latter number will show the exact frame. In case the register reads in whole feet the drum 1 should be approximately one foot in circumference and the periphery should be furnished with sixteen divisions each of which would then correspond to one frame of film. Where it is desired to compare a doubtful film with a master film, each film may be threaded over a path of the drum, care being taken that at the start the two films have like portions in lateral alignment. These films may then be drawn through the machine and compared frame by frame. If a portion of the doubtful film is missing this will be evident by inspection and the amount missing may readily be determined by aid of the register 2 and the marks on the drum 1. The film may be patched or cut immediately or a schedule of the necessary cuts and patches may be made for future reference.

While I have described a particular embodiment of my invention for purposes of illustration, it will be understood that various modifications and adaptations may be made within the spirit of the invention as set forth in the appended claims.

What I claim is:

1. A film counter and inspection device comprising a base, a film sprocket, means for rotatably supporting said sprocket on said base, said sprocket having a cylindrical surface with a circumference corresponding in size to an integral number of picture frames on the film and having a diameter sufficiently large to expose to view simultaneously a plurality of complete picture frames, and calibrations on said cylindrical surface in accordance with the number of picture frames per foot of film, a pointer cooperating therewith, means for directing film around said sprocket, and a revolution counter for said sprocket.

2. A film counter comprising a base, a film sprocket rotatably mounted thereon, and having a plurality of sets of sprocket teeth, said sprocket being one foot in circumference and carrying a scale calibrated according to picture frames, spring pressed means mounted on said base for holding a plurality of films in engagement around said sprocket, and a revolution counter for said sprocket mounted on said base.

JOSEPH H. SPRAY.